Oct. 3, 1967  R. J. HOLDEN ETAL  3,344,895
HAND BRAKE ARRANGEMENT
Filed March 2, 1966  6 Sheets-Sheet 1
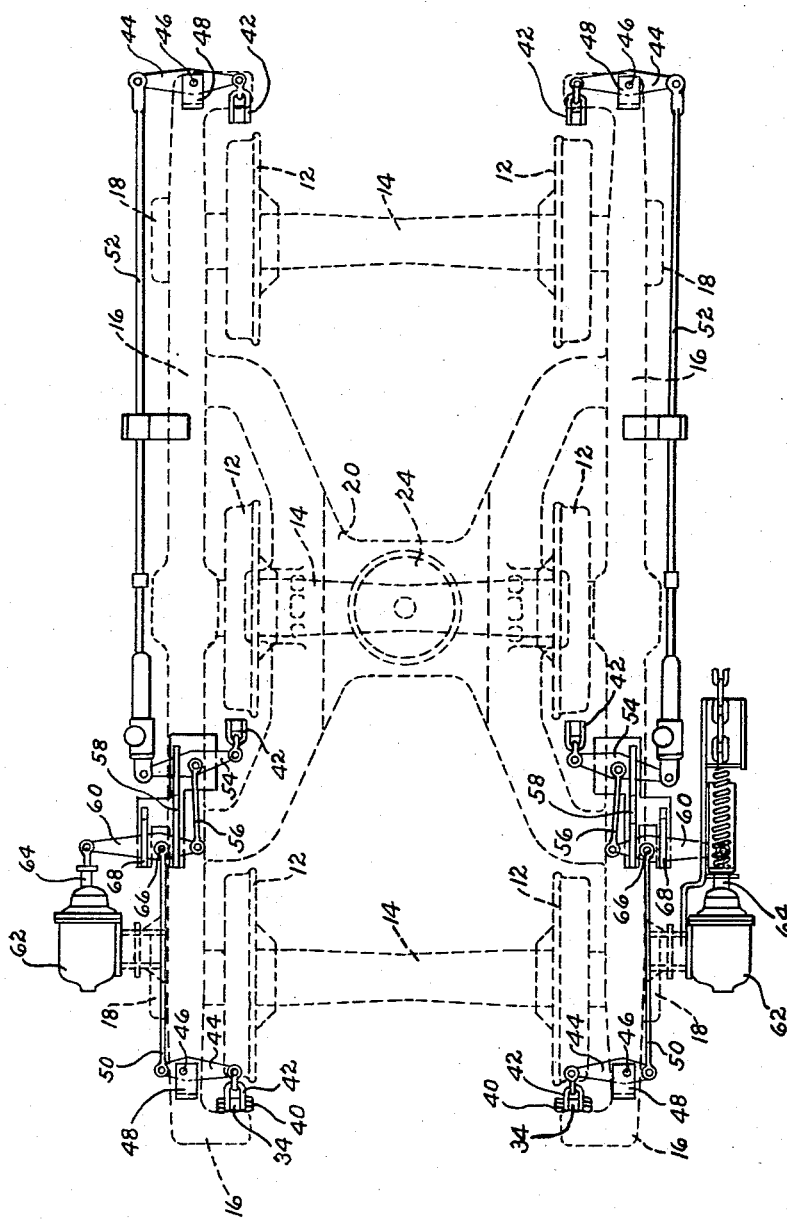
FIG. I.
INVENTORS.
ROY J. HOLDEN
RONALD P. BOLTE
BY Eugene N. Riddle
ATTORNEY

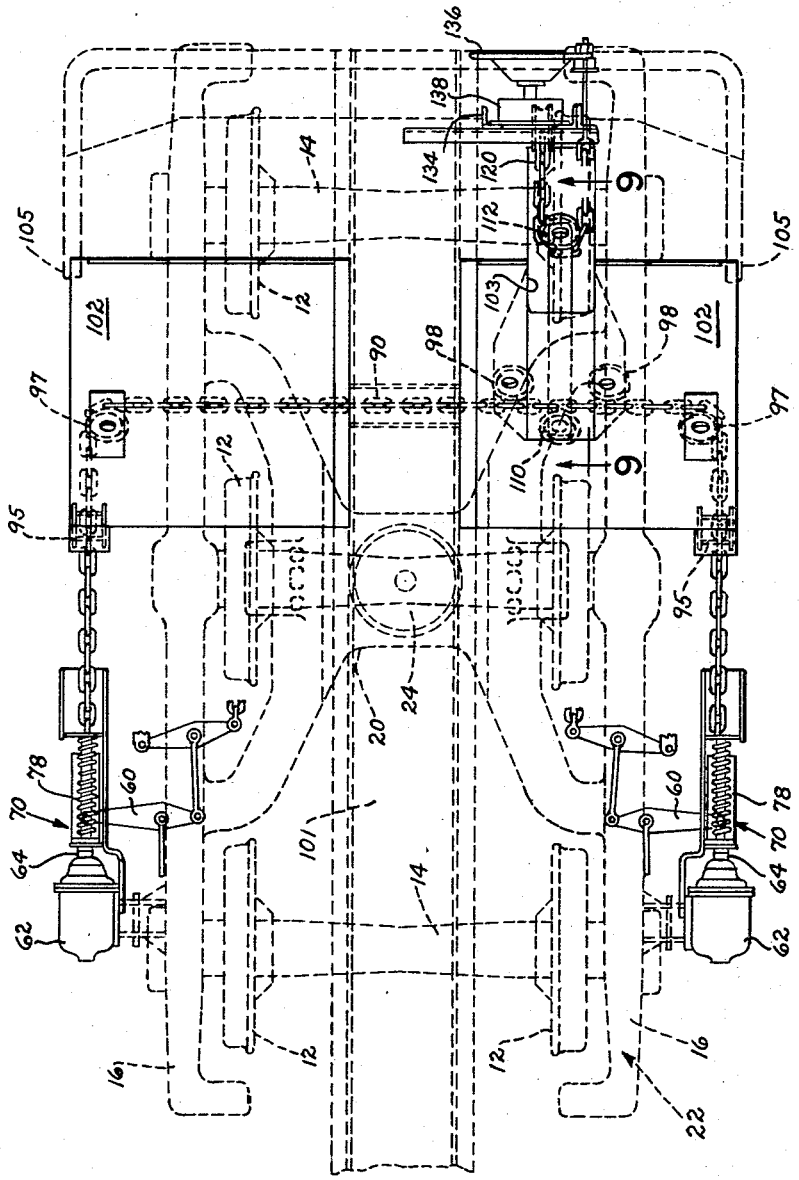
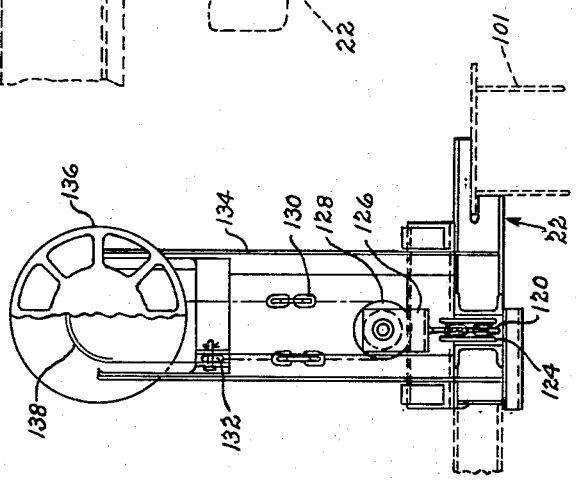

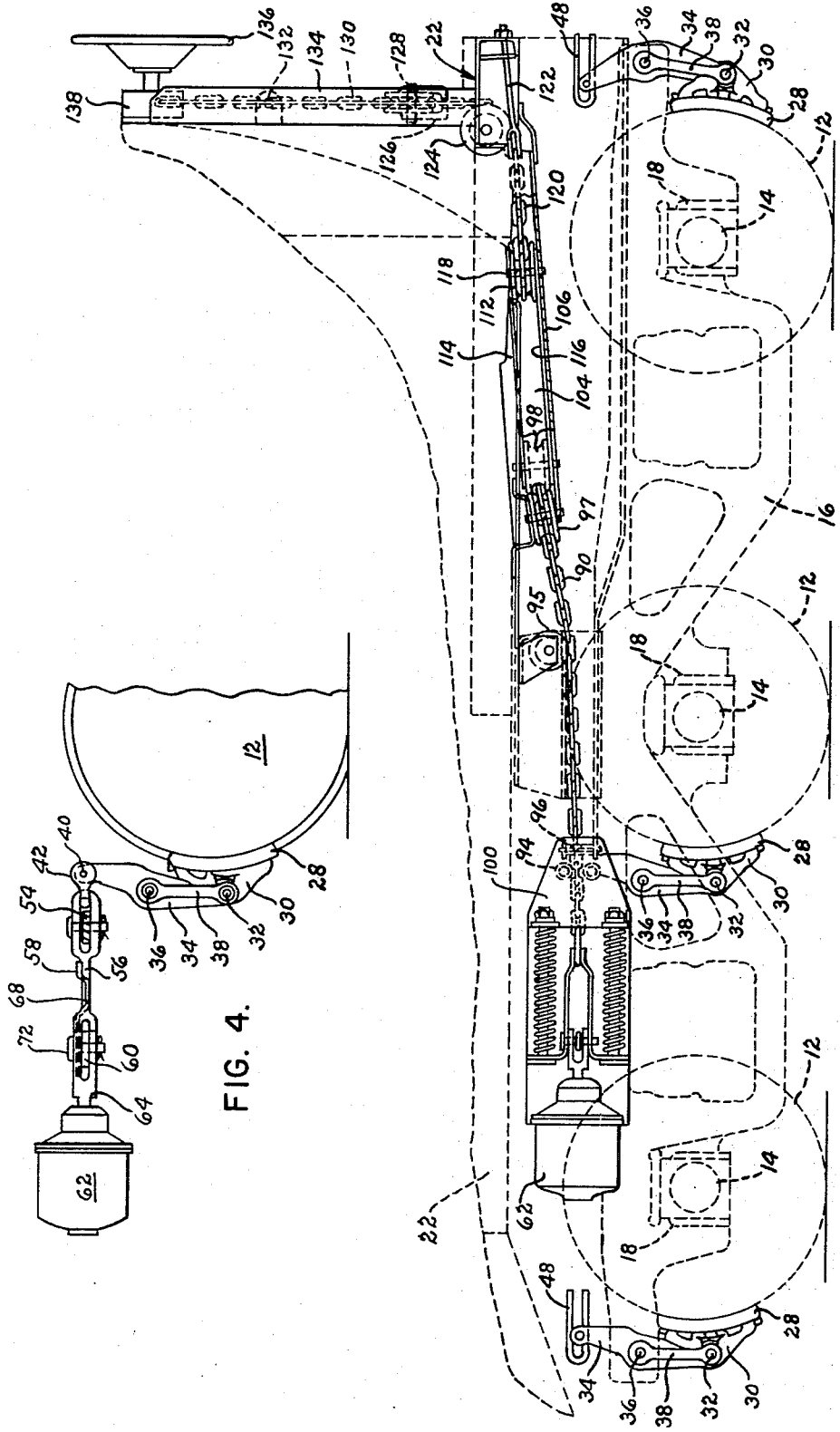

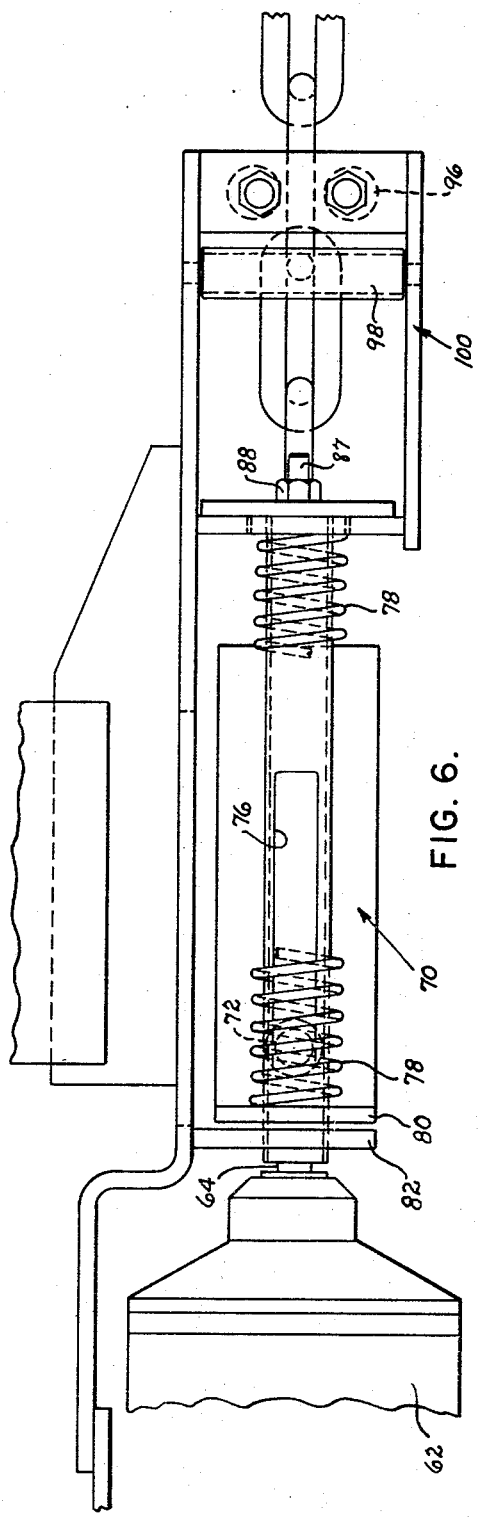
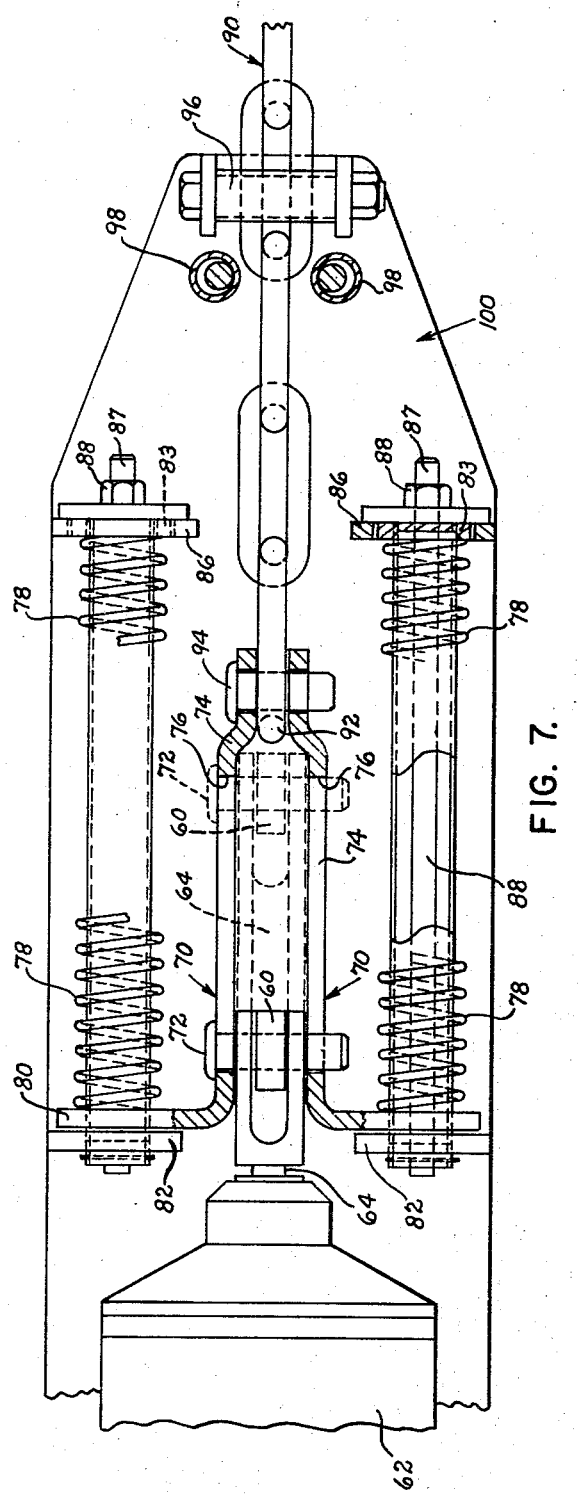
FIG. 6.
FIG. 7.

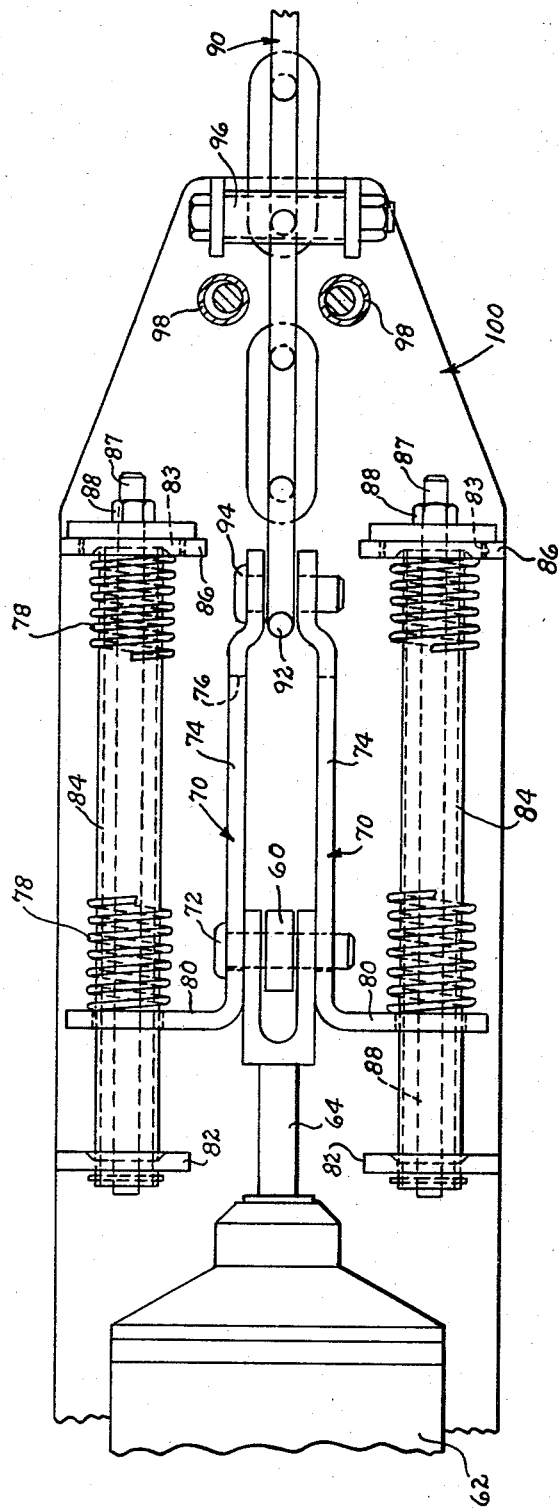

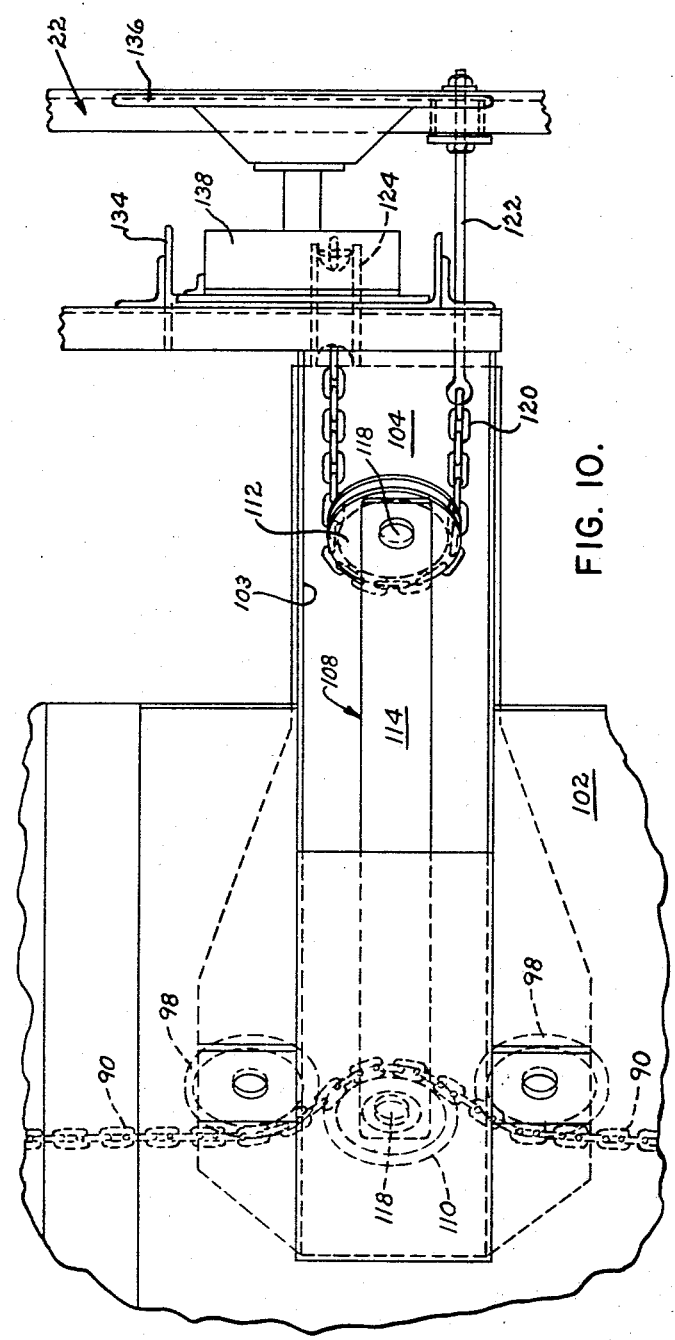
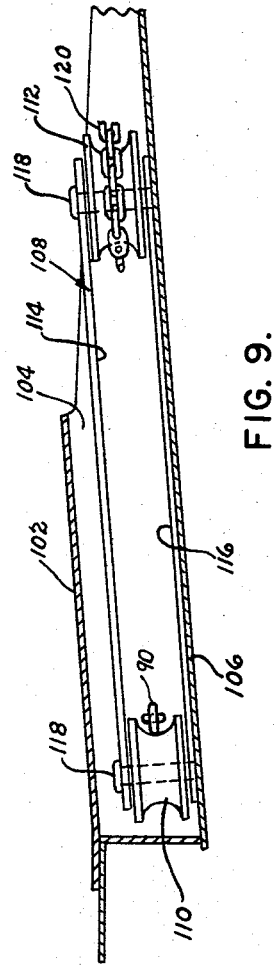
FIG. 10.
FIG. 9.

3,344,895
HAND BRAKE ARRANGEMENT
Roy J. Holden, St. Charles, and Ronald P. Bolte, St. Louis, Mo., assignors to ACF Industries Incorporated, New York, N.Y., a corporation of New Jersey
Filed Mar. 2, 1966, Ser. No. 531,171
15 Claims. (Cl. 188—107)

ABSTRACT OF THE DISCLOSURE

A hand brake arrangement especially adapted for a six wheel truck to equalize the brake applying force and employed with the power applied brake rigging. A freely floating sheave assembly on the car body has a pair of sheaves thereon and flexible members connect the sheaves with the brake cylinders on the truck and with a handwheel to permit a mechanical advantage of four-to-one upon actuation of the handwheel.

---

Hand brake arrangements for railway car trucks normally are mounted so as to actuate the brake cylinders and brake shoes independently of the power applied brake system. Upon the pivoting of the truck relative to the car body on curves and the like, hand brakes, heretofore, have, in many instances, tended to apply unequal forces to the truck wheels. With six wheel trucks the problem has become more acute since the outer limits of the truck swing a greater distance from the centerline of the track than four wheel trucks. The present invention provides a hand brake arrangement in which the brake applying force against the wheels is equalized under substantially all conditions of operations.

It is an object of the present invention to provide a hand brake arrangement for a railway car truck having power applied brake rigging with the hand brake arrangement being selectively employed.

Another object of the invention is the provision of such a hand brake arrangement in which a relatively high mechanical advantage is obtained from the manual operation of the hand brake.

A further object is the provision of such a hand brake arrangement in which the braking force applied against the truck wheels is equalized under substantially all conditions of operation and regardless of the relative rotated positions of the truck and car body.

A still further object is the provision of a hand brake rigging which remains taut and which is positively returned to a neutral position after braking.

Briefly described, the present invention comprises a brake rigging for a railway car having a supporting truck with a plurality of wheels at each side thereof, the brake rigging includes a brake cylinder on each side of the railway car truck outwardly of the adjacent truck wheels, brake shoes operatively connected to each brake cylinder for applying braking forces to the truck wheels for each side of the truck upon actuation of the associated brake cylinder, a flexible member extending between the brake cylinders and operatively connected to the piston rods thereof for actuation of the brake cylinders, means engaging the flexible member intermediate the brake cylinders for maintaining the flexible member taut, said engaging means being freely movable back and forth, and manual means operatively connected to said engaging means for moving said engaging means in one direction for actuating the brake cylinders to apply the brakes, said manual means including a handwheel adapted to be turned for setting of the brakes. Means are provided between the handwheel and the engaging means to obtain a mechanical ratio of about four (4) to one (1) thereby to facilitate turning of the handwheel. Also, a spring return for returning the brake rigging to its original position when the brakes are released is connected adjacent each end of the flexible member for aiding in maintaining the flexible member taut as well as returning the brake rigging after release of the brakes.

The invention accordingly comprises the constructions hereinafter described, the scope of the invention being indicated in the following claims.

In the accompanying drawings in which one of various possible embodiments of the invention is illustrated;

FIGURE 1 is a plan, partly schematic, of a power actuated brake system on a six-wheel truck;

FIGURE 2 is a plan, partly schematic of the hand brake arrangement comprising the present invention and adapted to be actuated independently of the power actuated system;

FIGURE 3 is a side elevation, partly schematic, showing the hand brake arrangement illustrated in FIGURE 2;

FIGURE 4 is an enlarged side elevation of a portion of the power actuated brake system shown in FIGURE 1 illustrating the connections between a brake cylinder and associated brake shoe;

FIGURE 5 is a partial end elevation of the railway car showing the handwheel structure for the manual actuation of the hand brake arrangement;

FIGURE 6 is an enlarged partial top plan of the portion of the hand brake arrangement connected to the brake cylinder;

FIGURE 7 is a side elevation, partly in section, of the arrangement shown in FIGURE 6;

FIGURE 8 is a side elevation similar to FIGURE 7 but showing the hand brake arrangement with the hand brakes set;

FIGURE 9 is a sectional view taken generally along line 9—9 of FIGURE 2 illustrating the sheave structure for pulling the hand brake arrangement taut; and FIGURE 10 is an enlarged fragment of FIGURE 2 showing the movable sheave assembly after the hand brake assembly is actuated to set the brakes.

Referring to the drawings and more particularly to FIGURES 1-4, a six-wheel railway car truck 10 has three pairs of wheels 12 mounted on axles 14. Side frames 16 are mounted on journals 18 and support a bolster 20. A railway car body or underframe, such as a tank car underframe, is indicated generally at 22 in FIGURE 3 and is supported on center plate 24 of bolster 20. Relative rotation between railway car body 22 and truck 10 is provided about the axis formed by center plate 24.

Mounted adjacent each wheel 12 is a brake shoe 28 adapted to engage the tread of the adjacent wheel 12. Carrying brake shoes 28 are brake levers 30 pivotally connected at 32 to hanger levers 34. Hanger levers 34 are pivotally connected at 36 to the adjacent side frame 16. A brake lever 38 extends between pivots 32 and 36. Pivotally connected at 40 to the upper end of each hanger lever 34 is a clevis 42. An end operating lever 44 at each end of truck 10 is pivotally mounted at 46 to a bracket 48 mounted on the adjacent side frame 16. One end of each end operating lever 44 is pivotally mounted to clevis 42 and the other end is pivotally connected to pull rod 50 or 52 as shown in FIGURE 1. An intermediate operating lever 54 adjacent each side frame 16 is pivotally connected adjacent one end to clevis 42 and pivotally connected adjacent its other end to pull rod 52. Pivotally connected to each lever 54 intermediate its ends is a pull rod 56. Levers 54 are freely movable or floating and fit under bracket 58. Pivotally connected to the ends of pull rods 56 opposite levers 54 are cylinder levers 60. Brake cylinders 62 have piston rods 64 pivotally connected to cylinder levers 60. Pull rods 50 are pivotally connected at 66 to cylinder levers 60. Cylinder levers 60 are freely movable or floating and fit within brackets 58 and brackets 68.

The above features form the power brake arrangement as shown in FIGURES 1 and 4 particularly. It is noted that FIGURES 1 and 4 illustrate the applied position of the brake rigging. Upon actuation of brake cylinders 62 from suitable controls (not shown) when the brakes are in a released position, piston rods 64 will be moved outwardly a distance of around three inches to actuate cylinder levers 60 and pull rods 50, 52 and 56 for pressing brake shoes 28 into contact with wheels 12 as shown in FIGURES 1 and 4. Upon release of the brakes, conventional return springs within cylinders 62 return piston rods 64 inwardly to their original position.

The hand brake arrangement comprising the present invention is connected to cylinder levers 60 for actuation of the braking system independently of the actuation of brake cylinders 62. FIGURES 2 and 3 show the hand brake arrangement for actuating cylinder levers 60. Referring also to FIGURES 6–8, angle-shaped pull members indicated generally at 70 receive a pin 72 extending through piston rod 64 and cylinder lever 60. Legs 74 of angle-shaped pull members are slotted at 76 to receive pin 72 and to permit pin 72 and piston rod 64 to move relative to pull members 70 when the power brakes are actuated such as shown in broken lines in FIGURE 7.

Pull members 70 have outturned legs 80 biased by springs 78 against abutments 82 secured to the railway car body 22. Springs 78 fit around tubular members 84 which are secured between abutments 82 and 86. Follower plates 83 are received within abutments 86 to permit removal of springs 78. Rods 87 extending between abutments 82 and 86 are received by tubular members 84 and are secured by nuts 88. Upon a release of the hand brakes, springs 78 return levers 60 and piston rods 64 to original neutral position. While brake cylinders 62 are normally provided with return springs, such return springs are not usually of a sufficient size and strength to insure the return of the hand brake arrangement. Thus, it is desirable to have additional return springs.

To extend pull members 70 to the position of FIGURE 8, a chain indicated generally at 90 has an end link 92 on each end thereof secured by pin 94 to pull members 70. Chain 90 extends between a pair of vertical rollers 96 and a pair of horizontal rollers 98. Rollers 96 and 98 are mounted on an adjacent bracket 100 secured to the adjacent side frame 16. Chain 90 is continuous and extends across truck 10 between brake cylinders 62. Mounted on car body 22 for guiding and supporting chain 90 are sheaves 95 and 97. Sheaves 95 are mounted for rotation about generally horizontal axes and sheaves 97 are mounted for rotation about generally vertical axes. Thus, swinging of truck 10 as occurs on track curves and the like effects relative movement between truck 10 and sheaves 95 and 97. Intermediate sheaves 98 are likewise mounted about generally vertical axes secured to car body 22 and restrict the angular movement of chain 90 when the hand brake arrangement is actuated.

A horizontal support plate 102 is secured adjacent each side of a center sill 101 and forms a part of car body 22. Each support plate 102 extends over truck 10 between center sill 101 and the adjacent side sill 105 as shown in FIGURE 2. One support plate 102 has a cutout portion 103 forming an entrance to a pocket 104 beneath the plate as shown particularly in FIGURES 9 and 10. A lower plate or pan 106 forms a bottom for pocket 104 and is inclined upwardly as shown in FIGURE 3. Mounted within pocket 104 on pan 106 is a freely movable sheave assembly 108 adapted to be moved along inclined pan 106. Sheave assembly 108 comprises a pair of sheaves 110 and 112 connected by upper and lower plates 114 and 116, respectively. Shafts 118 for sheaves 110, 112 secure plates 114 and 116. To move sheave assembly 108 for exerting tension on chain 90, a chain 120 is anchored at one end to bolt 122 secured to underframe 22 and extends about sheave 112 and under sheave 124. The other end of chain 120 extends upwardly from sheave 124 and is anchored or secured to a clevis 126 carried by a freely moving or floating sheave 128 as shown in FIGURES 3 and 5. Extending around sheave 128 is chain 130 anchored at 132 to hand brake stand 134 extending upwardly from the end of underframe 22. A handwheel 136 is mounted for rotation on stand 134 and has a drum 138 on which chain 130 is wound upon rotation of handwheel 136 in one direction as is well-known.

FIGURES 1, 2 and 3, show the brake rigging in the applied position of the brakes with piston rods 64 moving only a distance of around three inches. However, slots 76 in pull members 70 permit a movement of pin 72 of around eight inches as shown in broken lines in FIGURE 7. Thus, under certain slack conditions, the power actuated system may extend piston rods 60 as much as eight inches without affecting the hand brake arrangement.

If desired to actuate the hand brake arrangement with the brakes released, handwheel 136 is rotated to pull sheave 128 and clevis 126 upwardly. The upward movement of clevis 126 pulls sheave assembly 108 in a forward direction to the position of FIGURE 10. As sheave 110 on assembly 108 is in engagement with chain 90, chain 90 is pulled between sheaves 98 thereby to exert tension on chain 90. Pull members 70 are pulled by chain 90 a distance of around three inches to the position of FIGURE 8 thereby to extend piston rods 64 and actuate cylinder levers 60 for application of the brakes. Upon release of the brakes, springs 78 return the hand brake arrangement to its original position.

A relatively high mechanical advantage of four-to-one is obtained with the present hand brake arrangement. Chain 130 and sheave 128 provide a two-to-one mechanical advantage while chain 120 and sheave 112 also provide a two-to-one mechanical advantage. Thus, only a relatively low torque is required to rotate handwheel 136 for setting of the brakes.

Chain 90 extends outwardly of side frames 16 and does not extend through the bolster of underframe 22. Thus, upon swinging of truck 10 relative to underframe 22, such as occurs on curves or the like, chain 90 moves back and forth along sheaves 95, 97 and 98 to apply a substantially equal tension on cylinder levers 60 for equalizing the brake pressure.

The present invention has been found to work effectively on six-wheel trucks which swing a greater distance from the centerline of the truck than four wheel trucks. The brake applying force is equalized against the wheels under substantially all conditions of operations.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A hand brake arrangement for a railway car having a supporting truck with a plurality of wheels at each side thereof, said hand brake arrangement comprising a brake cylinder mounted on each side of the truck, a piston rod extending from each brake cylinder, a cylinder lever connected to each piston rod, brake shoes operatively connected to each cylinder lever for engaging the respective adjacent wheels, a single flexible member connected between the cylinder levers and extending across the truck, guide means fixed to each side of the railway car body to guide the flexible member between the cylinder levers and to permit pulling of the piston rods in a direction longitudinally of the car, a floating sheave in engagement with said flexible member at a position intermediate the sides of the truck, a handwheel adapted to be rotated for setting the brakes, and means operatively connecting the handwheel and floating sheave whereby rotation of said hand wheel in one direction moves said sheave in a direction generally longitudinally of the railway car to pull said flexible member in a direction to actuate said cylinder levers for setting of the brakes.

2. A hand brake arrangement as set forth in claim 1 wherein said means operatively connecting the handwheel and floating sheave comprises a floating sheave assembly carrying said floating sheave adjacent an end thereof, said sheave assembly being freely movable back and forth in a direction generally longitudinally of the railway car and having a second floating sheave adjacent the opposite end thereof, and a second flexible member anchored adjacent one end thereof and extending about said second sheave, said handwheel being operatively connected to said second flexible member to pull said sheave assembly in a direction to actuate said cylinder levers for setting of the brakes.

3. A hand brake arrangement as set forth in claim 1 wherein a generally vertical handwheel stand is secured adjacent an end of the railway car and mounts said handwheel for rotation, a floating sheave is positioned adjacent the lower end of said stand, a second flexible member is anchored at one end and extends about said second mentioned floating sheave to said handwheel whereby rotation of the handwheel moves said second mentioned sheave, and a third flexible member is anchored at one end and operatively connected between said floating sheaves whereby a mechanical advantage of around four to one is obtained by said hand brake arrangement.

4. A hand brake arrangement as set forth in claim 1 wherein spring means are operatively connected between each piston rod and the adjacent end of said first mentioned flexible member thereby to return said flexible member and piston rods to neutral position after actuation of the hand brake arrangement.

5. A hand brake arrangement for a railway car having a supporting truck with a plurality of wheels at each side thereof, said hand brake arrangement comprising a brake cylinder adjacent each side of the truck, a piston rod extending from each brake cylinder, a cylinder lever connected to each piston rod, brake shoes operatively connected to each cylinder lever for engaging the respective adjacent wheels, a flexible member connected between the brake levers and extending across the truck, means fixed to the railway car body to guide the flexible member between the cylinder levers, spring means operatively connected between each piston rod and the adjacent end of said flexible member to return the flexible member and piston rod to neutral position after actuation of the hand brake arrangement, said spring means comprising a pair of spaced arms receiving the adjacent piston rod and a compression spring urging each arm to a neutral position, a floating sheave in engagement with said flexible member at a position intermediate the sides of the truck, a handwheel adapted to be rotated for setting the brakes, means operatively connecting the handwheel and floating sheave whereby rotation of said handwheel in one direction moves said sheave in a direction generally longitudinally of the railway car to pull said flexible member, means connecting the adjacent cylinder lever to the arms for movement therewith upon actuation of said handwheel and said flexible member to actuate the cylinder levers for setting of the brakes, and lost motion means between said arms and said piston rod to permit said piston rod and connected cylinder lever to move relative to said arms upon actuation thereof by separate power means.

6. A hand brake arrangement for a railway car having a car body supported on a six wheel truck with three wheels at each side of the truck, said hand brake arrangement comprising a cylinder lever on each side of the truck mounted for pivotal movement about a generally vertical axis, brake shoes operatively connected to each cylinder lever for engaging the respective adjacent wheels, a single flexible member connected between the cylinder levers and extending across the truck in a generally U-shape, a sheave fixed to each side of the railway car body for rotation about a generally vertical axis to guide the flexible member between the cylinder levers in said generally U-shape, a freely movable sheave in engagement with said flexible member at a position intermediate the sides of the truck between the sheaves fixed to the railway car body, a handwheel adapted to be rotated for setting the brakes, and means operatively connecting the handwheel and freely movable sheave whereby rotation of said handwheel in one direction moves said freely movable sheave in a generally longitudinal direction to pull said first mentioned flexible member in a direction to actuate said cylinder levers for setting of the brakes.

7. A hand brake arrangement for a railway car as set forth in claim 6 wherein said means operatively connecting the handwheel and freely movable sheave comprises a sheave assembly carrying said freely movable sheave adjacent an end thereof, said sheave assembly being movable back and forth in a direction generally longitudinally of the railway car and having a second sheave adjacent the opposite end thereof, and a second flexible member anchored adjacent one end thereof and extending about said second sheave, said handwheel being operatively connected to said second flexible member to pull said sheave assembly in a direction to actuate said cylinder levers for setting of the brakes.

8. A hand brake arrangement for a railway car as set forth in claim 6 wherein a generally vertical handwheel stand is secured adjacent an end of the railway car and mounts said handwheel for rotation, a freely movable sheave is positioned adjacent the lower end of said stand, a second flexible member is anchored at one end and extends about said second mentioned freely movable sheave to said handwheel whereby rotation of the handwheel moves said second mentioned sheave, and a third flexible member is anchored at one end and operatively connected between said freely movable sheaves whereby a mechanical advantage of around four to one is obtained by said hand brake arrangement.

9. A hand brake arrangement for a railway car having a car body supported on a truck with a plurality of wheels at each side of the truck, a side frame on each side of the truck, said hand brake arrangement comprising a brake cylinder secured outwardly of each side frame at a position outwardly of the adjacent wheels, a piston rod extending from each brake cylinder, a cylinder lever connected to each piston rod and mounted for pivotal movement about a generally vertical axis, brake shoes operatively connected to each cylinder lever for engaging the respective adjacent wheels, a generally U-shaped flexible member connected between the cylinder levers extending longitudinally outwardly of the side frames and thence across the truck, means fixed to each side of the railway car body to guide the flexible member between the cylinder levers, a freely movable sheave in engagement with said flexible member at a position intermediate the side frames, a handwheel adapted to be rotated for setting the brakes, and means operatively connecting the handwheel and freely movable sheave whereby rotation of said handwheel in one direction moves said freely movable sheave in a direction generally longitudinally of the railway car to pull said flexible member in a direction to actuate said cylinder levers for setting the brakes, said means fixed to each side of the railway car body to guide the flexible member being positioned generally in longitudinal alignment with the adjacent piston rod whereby upon rotation of the handwheel the pulling force is exerted generally axially of the adjacent piston rods.

10. A hand brake arrangement as set forth in claim 9 wherein spring means are operatively connected between each piston rod and the adjacent end of said flexible member thereby to return said flexible member and piston rod to neutral position after actuation of the hand brake arrangement.

11. A hand brake arrangement for a railway car having a car body supported on a truck with a plurality of wheels at each side of the truck, a side frame on each side of the truck, said hand brake arrangement comprising a brake cylinder secured outwardly of each side frame at a position outwardly of the adjacent wheels, a piston rod extending from each brake cylinder, a cylinder lever connected to each piston rod and mounted for pivotal movement about a generally vertical axis, brake shoes operatively connected to each cylinder lever for engaging the respective adjacent wheels, a flexible member connected between the cylinder levers extending longitudinally outwardly of the side frames and thence across the truck, means fixed to the railway car body to guide the flexible member between the cylinders levers, spring means operatively connected between each piston rod and the adjacent end of said flexible member thereby to return the flexible member and piston rod to neutral position after actuation of the hand brake arrangement, said spring means comprising a pair of spaced arms receiving the adjacent piston rod and a compression spring urging each arm to a neutral position, a freely movable sheave in engagement with said flexible member at a position intermediate the side frames, a handwheel adapted to be rotated for setting the brakes, means operatively connecting the handwheel and freely movable sheave whereby rotation of said handwheel in one direction moves said freely movable sheave in a direction generally longitudinally of the railway car to pull said flexible member, said means fixed to the railway car body to guide the flexible member being positioned generally in longitudinal alignment with the adjacent piston rod whereby upon rotation of the handwheel the pulling force is exerted generally axially of the adjacent piston rods, means connecting the adjacent cylinder lever to the arms for movement therewith upon actuation of said handwheel and said flexible member to actuate the cylinder levers for setting of the brakes, and lost motion means between said arms and the adjacent piston rod to permit said piston rod and connected cylinder lever to move relative to said arms upon actuation thereof by separate power means.

12. A hand brake arrangement for a railway car having a car body supported on a truck with a plurality of wheels at each side of the truck, a side frame on each side of the truck, said hand brake arrangement comprising a brake cylinder secured outwardly of each side frame at a position outwardly of the adjacent wheels, a piston rod extending from each brake cylinder, a cylinder lever connected to each piston rod and mounted for pivotal movement about a generally vertical axis, brake shoes operatively connected to each cylinder lever for engaging the respective adjacent wheels, a generally U-shaped flexible member connected between the cylinder levers extending longitudinally outwardly of the side frames and thence across the truck, means fixed to each side of the railway car body to guide the flexible member between the cylinder levers, a freely movable sheave assembly mounted adjacent the flexible member intermediate the side frames, said sheave assembly having a sheave adjacent each end thereof and extending in a direction longitudinally of the railway car body, the inner sheave being in engagement with said flexible member, a handwheel adapted to be rotated for setting the brakes, and a second flexible member operatively connecting the handwheel to the outer sheave of said sheave assembly whereby rotation of said handwheel in one direction moves said sheave assembly in a direction generally longitudinally of the railway car to pull said first mentioned flexible member in a direction to actuate said cylinder levers for setting of the brakes.

13. A hand brake arrangement for a railway car as set forth in claim 12 wherein said sheave assembly is carried by the railway car body and is guided thereby for longitudinal movement relative to the railway car body upon rotation of the handwheel in said one direction.

14. A hand brake arrangement for a railway car having a car body supported on a six wheel truck with three wheels and a side frame adjacent each side of the truck, said hand brake arrangement comprising a brake cylinder mounted on at least one side frame, a piston rod extending from the brake cylinder, a cylinder lever connected to the piston rod, brake shoes operatively connected to the cylinder lever for engaging the respective adjacent wheels, a manual operator mounted on a stand and adapted to be actuated manually for setting the brakes, a floating sheave below the manual operator, a generally vertically extending flexible member anchored adjacent one end and operatively connecting the manual operator and floating sheave for moving the floating sheave in a generally vertical direction, a freely movable sheave assembly supported on the car body for relative movement in a generally horizontal direction and having a sheave adjacent each end thereof movable with the sheave assembly, a second flexible member operatively connecting said first mentioned floating sheave and one of the sheaves in said sheave assembly, a third flexible member operatively connecting the other of said sheaves in said sheave assembly to the cylinder lever whereby actuation of said manual operator moves said floating sheave and said sheave assembly in a direction to actuate the cylinder lever for setting of the brakes, and guide means on the car body to guide said third flexible member between said cylinder lever and said other sheave in said sheave assembly.

15. A hand brake arrangement for a railway car having a car body supported on a truck with a plurality of wheels and a side frame adjacent each side of the truck, said hand brake arrangement comprising a brake cylinder mounted on a side frame, a piston rod extending from the brake cylinder a cylinder lever connected to the piston rod, brake shoes operatively connected to the cylinder lever for engaging the respective adjacent wheels, a manual operator adapted to be actuated manually for setting the brakes, a freely movable sheave assembly supported on the car body for relative movement and having a sheave adjacent each end thereof movable with the sheave assembly, a flexible member operatively connecting said manual operator and one of the sheaves in said sheave assembly, a second flexible member operatively connecting the other of said sheaves in said sheave assembly to the cylinder lever whereby actuation of said manual operator moves said floating sheave assembly in a direction to actuate the cylinder lever for setting of the brakes, and guide means on the car body to guide said second flexible member between said cylinder lever and said other sheave in said sheave assembly.

References Cited

UNITED STATES PATENTS

| | | | |
|---|---|---|---|
| 1,792,895 | 2/1931 | Cowlishaw. | |
| 1,998,975 | 4/1935 | Baselt | 188—107 |
| 2,359,081 | 9/1944 | Blomberg | 188—107 |
| 2,416,871 | 3/1947 | Gaenssle | 188—107 |
| 2,686,575 | 8/1954 | Bunker | 188—107 |

DUANE A. REGER, *Primary Examiner.*